United States Patent
Suzuki et al.

(10) Patent No.: US 7,020,367 B2
(45) Date of Patent: Mar. 28, 2006

(54) OPTICAL COUPLER

(75) Inventors: Kouichi Suzuki, Tokyo (JP); Tadahiko Hanada, Tokyo (JP); Yutaka Urino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/474,842

(22) PCT Filed: Aug. 2, 2002

(86) PCT No.: PCT/JP02/07908

§ 371 (c)(1), (2), (4) Date: Aug. 12, 2004

(87) PCT Pub. No.: WO03/014788

PCT Pub. Date: Feb. 20, 2003

(65) Prior Publication Data

US 2004/0264863 A1    Dec. 30, 2004

(30) Foreign Application Priority Data

Feb. 8, 2001   (JP) ............................. 2001-235124

(51) Int. Cl.
*G02B 6/26* (2006.01)
(52) U.S. Cl. ...................................................... 385/43
(58) Field of Classification Search ............ 385/14–16, 385/24, 31, 39, 40–43; 359/110–114; 398/42, 398/45, 79
See application file for complete search history.

(56) References Cited

U.S. PATENT DOCUMENTS

| | | | |
|---|---|---|---|
| 3,866,143 A | * | 2/1975 | Jacobs et al. ............ 331/107 R |
| 3,944,950 A | * | 3/1976 | Jacobs et al. ............... 333/164 |
| 5,127,081 A | * | 6/1992 | Koren et al. ................ 385/130 |
| 5,546,483 A | * | 8/1996 | Inoue et al. .................. 385/14 |

FOREIGN PATENT DOCUMENTS

| | | | |
|---|---|---|---|
| JP | H09-15435 A | 1/1997 | |
| JP | 2850996 | * 11/1998 | ................. 385/43 |
| JP | 2850996 B2 | 11/1998 | |
| JP | 2929481 B2 | 5/1999 | |

* cited by examiner

*Primary Examiner*—Akm Enayet Ullah
(74) *Attorney, Agent, or Firm*—Sughrue Mion, PLLC (57) ABSTRACT

An optical coupler comprises a tapered waveguide formed so that a waveguide width may be narrower as going from a predetermined starting position toward an emission end of a light signal. A difference between a first coupling factor and a second coupling factor is set within a predetermined range. The first coupling factor is the coupling factor to a waveguide having the same width as that in a first position in an inherent mode in the case where the tapered waveguide is cut in the first position. A second coupling factor is the coupling factor to a waveguide having the same width as that in a second position where is separated at a predetermined distance from the first position along a direction toward the emission end in an inherent mode in the case where the tapered waveguide is cut in the second position.

10 Claims, 12 Drawing Sheets

OPTICAL COUPLER

TECHNICAL FIELD

The present invention relates to an optical coupler for connecting an optical fiber and an optical integrated circuit used for optical communications.

BACKGROUND ART

Figure 16:
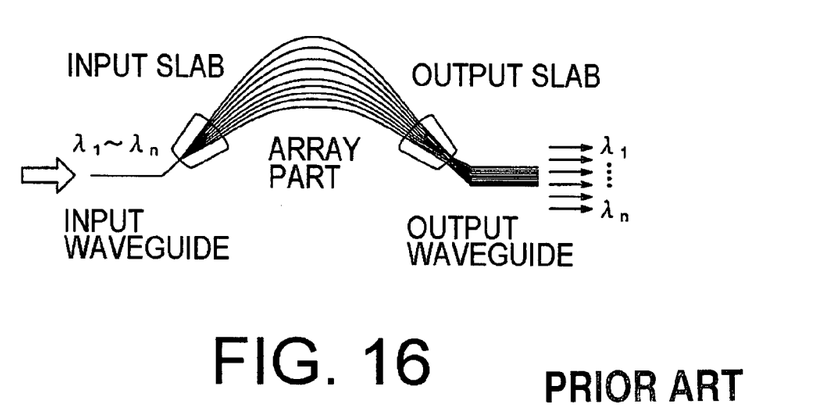
FIG. 16 is a explanatory diagram showing a construction of an AWG (Arrayed Waveguide Grating) element that is a waveguide type optical function element.

With recent growing demand for communications, an optical communication system using DWDX (Dense Wavelength Division Multipex) suitable for high-volume and long-distance transmission is extensively used. As a key component of the DWDX system, demand for a waveguide type optical function element such as an AWG (Arrayed Waveguide Grating) element shown in FIG. 16 (plan view) is increasing. In order to reduce costs and enhance functionality of such waveguide element, it is important to miniaturize the element size. To miniaturize the element size, increase in the refractive index difference $\Delta n$ between a core (refractive index $n_1$) and a cladding (refractive index $n_2$) of the waveguide is effective. Increasing the refractive index difference $\Delta n$, light can be strongly confined within the waveguide, and thereby, respective waveguide components such as a minimum bend radius of a bend waveguide can be reduced and accordingly, the element size can be reduced.

However, when $\Delta n=(n_1^2-n_2^2)\div(n_1^2+n_2^2)$ is increased, the spot diameter of the lightwave within the waveguide is reduced and becomes smaller than the spot diameter of the optical fiber, and large coupling loss will be generated due to mismatching of the lightwave spot size in the connecting portion. For example, in a PLC (Planar Lightwave Circuit) type waveguide device, the connection loss when connecting by the direct butt joint method is, for $\Delta n=1.5\%$, nearly 2.0 dB on one end and 4.0 dB on both ends. This loss exceeds the general acceptable loss value of the waveguide device.

Figure 17:
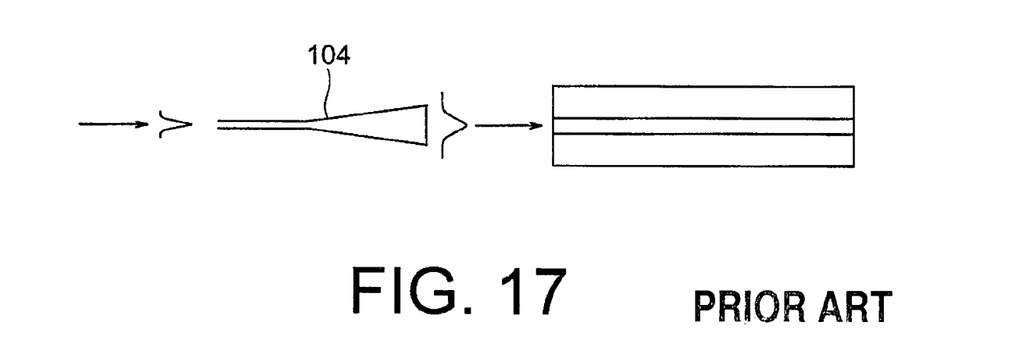
FIG. 17 is a block diagram showing a partial construction of the conventional tapered type optical coupler.

In order to reduce the loss, the development of a spot size conversion type optical coupler, by enlarging the spot size of the lightwave of the waveguide device, as well as in a semiconductor laser, for matching the spot size to the spot size of the optical fiber is being promoted. Previously, the technique for enlarging a lightwave field at the tip portion to the spot size of the optical fiber has been adopted by enlarging the tip portion of the waveguide using a two-dimensional tapered waveguide structure as shown in FIG. 17. In addition, various spot size converters for three-dimensionally varying the form of the core are manufactured, however, a problem that the process becomes complicated arises by this technology.

The tapered waveguide structure shown in FIG. 17 is conventionally and most widely used for two-dimensionally enlarging the spot size of the waveguide 1401 by widening the width of the waveguide 1401 in the shape of a horn. In the case of using such technique, the spot size along the horizontal direction can be adiabatically enlarged without curving the wavefront and changing the entire appearance, however, the spot size along the vertical direction to the substrate is not enlarged. Therefore, half of the coupling loss can be improved (coupling loss of 1.6 dB to 0.8 dB), but more improvement can not be expected. The above described technique is an effective technique in the case where the coupling loss is originally small, however, a desired effect can not be obtained when coupling loss is large.

Accordingly, plural new methods for enlarging the vertical spot size are proposed. One of them is a technique for enlarging the spot size by narrowing the waveguide width to weaken the binding by the waveguide. Further, there is another technique for enlarging the spot size by three-dimensionally widening or narrowing the vertical waveguide structure.

For example, in Document 1 (Publication of Japanese Patent No. 2,929,481) discloses that a tapered type optical coupler in which the normalized propagation constant V at the tip of the waveguide is designed so that the coupling factor to an optical fiber may be optimized.

In the technology of Document 1, in the waveguide structure having the normalized propagation constant b "$=(n_{\textit{eff}}^2-n_2^2)\div(n_1^2+n_2^2)$" set equal to or more than 0.1 and equal to or more than 0.01 as a parameter, so that the coupling efficiency to the optical fiber may provide low loss, and the spot size is converted generally from the waveguide portion toward the tip portion by the tapered waveguide.

Here, $n_{\textit{eff}}$ is a propagation constant of the waveguide and indicates an effective wave number of light propagating within the waveguide in a traveling direction. On the other hand, the normalized propagation constant b is a value obtained by normalizing the propagation constant $n_{\textit{eff}}$ using the refractive indices $n_1$ and $n_2$ of the core and the cladding, and a parameter used when comparing the propagation constants between the waveguides having different materials and structures.

The normalized propagation constant b of nearly 1 indicates that the wave number of the waveguide in the traveling direction is substantially the same with the wave number of the core of the waveguide in the traveling direction, and in this case, most of the light energy is confined within the core. On the other hand, the normalized propagation constant b of nearly 0 indicates that the spot of the lightwave expands wider than the core, and most of the light energy exists in the cladding. The normalized propagation constant b is also a parameter that indicates a ratio at which lightwaves guided in the waveguide feel the core, and, for example, "b=0.07" can be taken as that 7% of the guided lightwaves propagate within the waveguide core.

However, even when constructing as disclosed in Document 1, the radiation loss is generated while narrowing the waveguide width to the target width, stable conversion of the lightwave cannot be performed. In the case of narrowing the waveguide width to the target width using the technology of Document 1, the lightwave is coupled to the radiation mode and the radiation loss is generated. In the technology of Document 1, there is a place where the coupling loss locally becomes small, however, because of the above described radiation loss, the tolerance of the low-loss portion can not be ensured.

Figure 18:
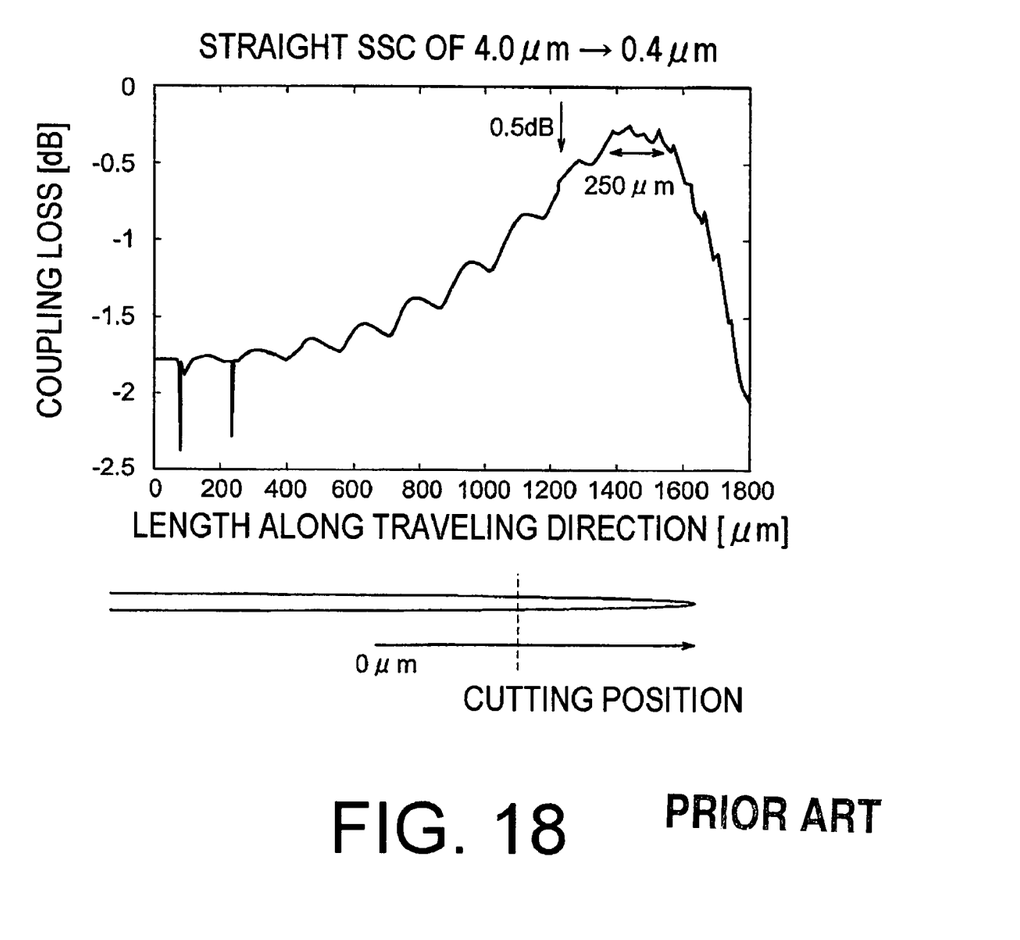
FIG. 18 is an explanatory diagram showing the transition of the coupling efficiency in the linear tapered type tapered optical coupler, which is analyzed by using the three-dimensional beam propagation method.

FIG. 18 shows transition of the coupling efficiency in the linearly tapered type tapered optical coupler, which is analyzed by using the three-dimensional beam propagation method. That represents the coupling loss when the tapered waveguide is cut in the middle of the traveling direction and the optical fiber is coupled to the cut end. The horizontal axis indicates the distance in the traveling direction, and the vertical axis indicates the coupling loss. This structure is assumed as a PLC device, and has the waveguide structure of 4.0 μm×4.0 μm, the cladding refractive index $n_2=1.457568$, $\Delta n=1.3\%$, and a straight tapered structure having taper length of 1,200 μm and the waveguide reduced to 0.4 μm×0.4 μm. Coupled to the linear waveguide without using the spot size converter, the loss of 1.6 dB is generated.

As shown in FIG. 18, in the case of above described optical coupler, as the propagating light signal travels in the traveling direction of the waveguide, the coupling loss is improved to a maximum of 0.4 dB (in the vicinity of 1,400 μm). However, since the propagating lightwave (light signal) has been converted into the radiation mode, the spot size is too much enlarged and the coupling loss is largely increased. In this condition, the region in which the coupling loss is equal to or less than 0.5 dB is merely over about 250 μm. Since the radiation mode as shown here has broken free from the binding of the waveguide and will remain to be enlarged only, it is difficult that the region, in which the coupling efficiency is good, is made over equal to or more than 1 mm.

In order to improve the above described problems, a spot size converter designed to have a structure for performing stable lightwave conversion by using a curve form such as polynomial for the change of taper provided to the optical waveguide is proposed. However, even if such structure is used, the radiation mode is generated before reaching the waveguide structure having the optimal coupling factor, and thereby the coupling factor and the tolerance will be largely reduced, as shown in FIG. 18.

Figure 19:
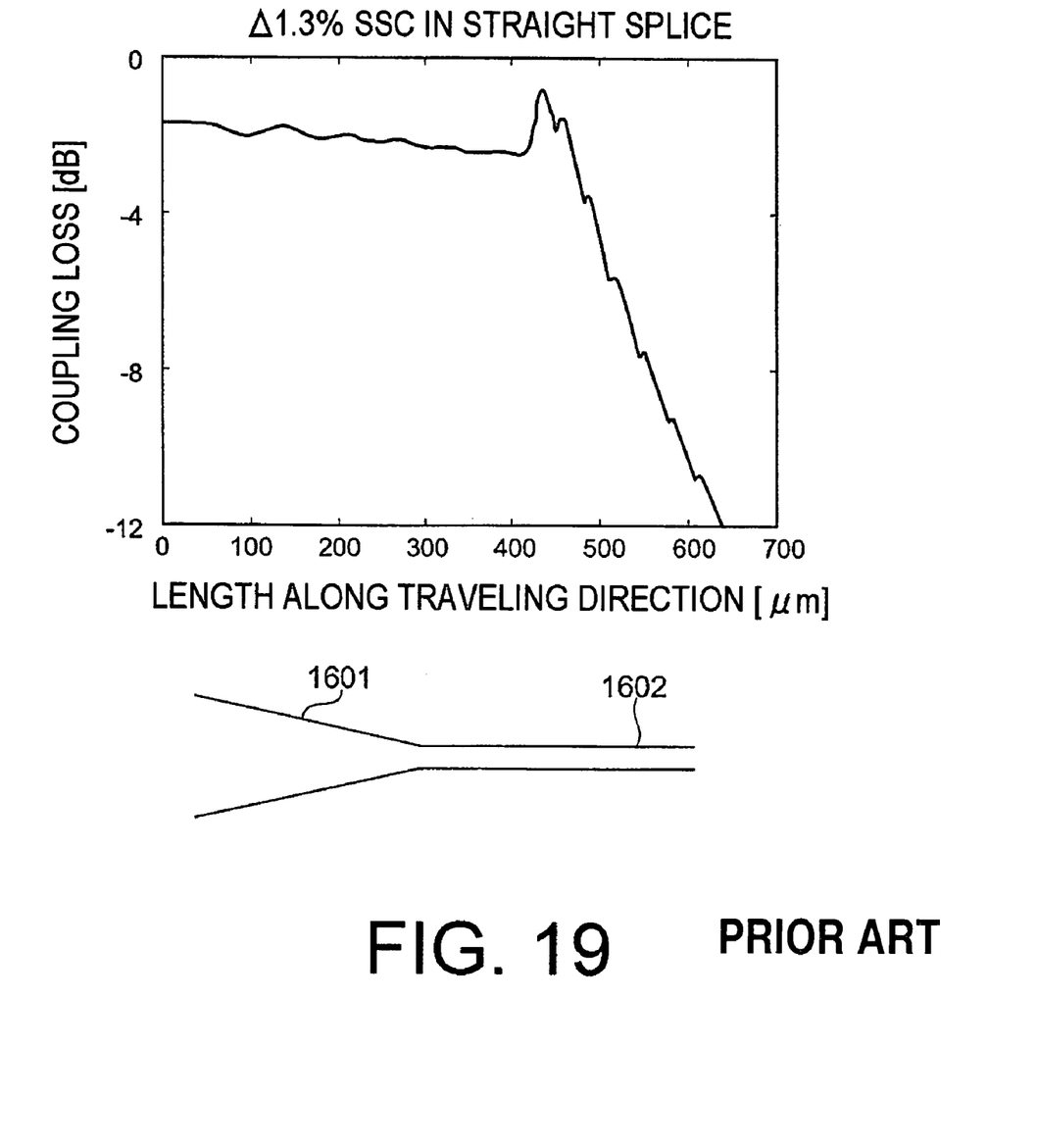
FIG. 19 is a block diagram showing a partial construction of the conventional tapered type optical coupler.

Further, as shown in FIG. 19, even when the linear waveguide 1602 is coupled to the position of the tapered region 1601, which has become good in the coupling factor, the coupling tolerance to the optical fiber is not improved. This is caused by that most of the lightwaves are converted into the radiation mode before reaching the linear waveguide. It is seen that, once the lightwave has been coupled to the radiation mode, the wavefront thereof is being curved, and thereby, the lightwave is not coupled only by disposing the linear waveguide.

As described above, in the conventional optical coupler, the locally large improvement in the coupling efficiency can be obtained, however, the tolerance in the cutting position becomes strict and the displacement of the cutting position will cause the serious deterioration of the coupling loss. As described above, the peak coupling efficiency of the conventional optical coupler is a little less than 0.5 dB, however, the tolerance is equal to or less than several hundreds of micrometers and the coupling loss will be determined depending on the cutting accuracy in the chip cutting process. On this account, in the conventional optical coupler, the yields of the optical waveguide device will be determined depending on the accuracy of the cutting position of the optical coupler.

Furthermore, in the optical coupler having a three-dimensionally designed waveguide structure, the stable coupling is possibly obtained, however, there is a problem that the manufacturing process for forming the three-dimensional structure becomes complicated.

DISCLOSURE OF THE INVENTION

The invention is achieved to overcome the above described problems, and objected to reduce the coupling loss to the optical fiber without increasing the manufacturing cost.

An optical coupler in one embodiment of the invention comprises a tapered waveguide formed so that a waveguide width may be narrower as going from a predetermined starting position toward an emission end of a light signal, and a difference between a first coupling factor to a waveguide having the same width as that In a first position in an inherent mode in the case where the tapered waveguide is cut in the first position and a second coupling factor to a waveguide having the same width as that in a second position where is separated at a predetermined distance from the first position along a direction toward the emission end in an inherent mode in the case where the tapered waveguide is cut in the second position is set within a predetermined range.

According to the optical coupler, the light signal propagating the tapered waveguide has the spot size that expands as it travels toward the emission end.

In the above described optical coupler, the difference of the first coupling factor and the second coupling factor may be lower than a third value obtained by subtracting from 1 a second value resulted by raising a first value obtained by subtracting from 1 desired coupling loss to a subject, to which the light signal emitted from the emission end at a tip of the emission end is coupled, to the power of a number of division of dividing the tapered waveguide by the distance between the first position and the second position, for example.

An optical coupler in another embodiment of the invention comprises a tapered waveguide formed so that a waveguide width may be narrower as going from a predetermined starting position toward an emission end of a light signal, and change in the width of the tapered waveguide changes toward an traveling direction of the light signal in a form of an exponential function.

According to the optical coupler, the light signal propagating the tapered waveguide has the spot size that expands as it travels toward the emission end.

In the above described optical coupler the exponential function may be expressed by $W(z)=(W_i-W_o)\exp(-\alpha_1 z)+W_o$, assuming that a waveguide width is $W$, a distance from a start point of the tapered waveguide is $z$, an initial waveguide width of the tapered waveguide is $W_i$, a width of the emission end is $W_o$, and a constant calculated from of an initial waveguide width deduction value at the time of starting of the tapered waveguide is $\alpha_1$.

In the above described optical coupler, the waveguide can be constituted by, for example, a silicon system glass material, a semiconductor, or a polymeric material.

Another construction of the invention will be seen clearly as the following description is read.

BEST MODE FOR CARRYING OUT THE INVENTION

Hereinafter, embodiments of the invention will be described by referring to the drawings.

Figure 1:
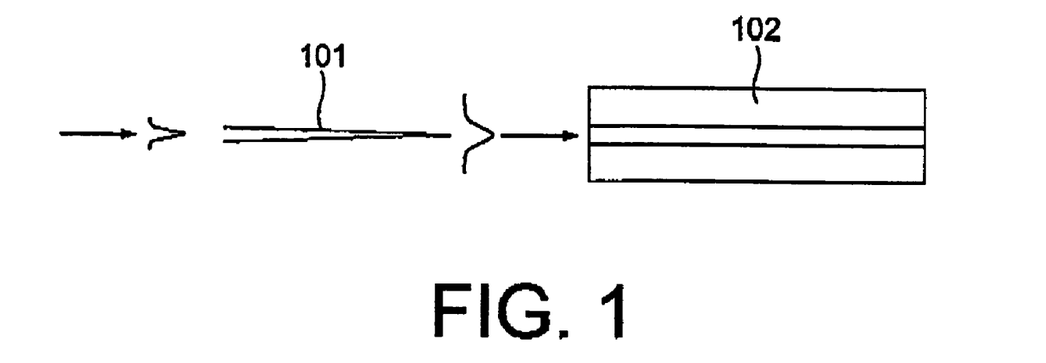
FIG. 1 is a plan view showing a schematic construction of an optical coupler in an embodiment of the invention.
Figure 2:
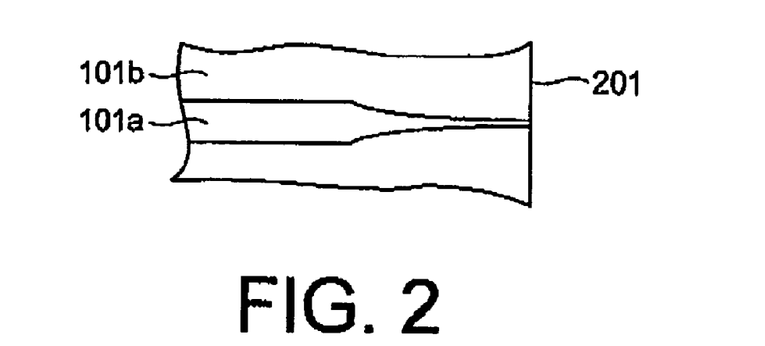
FIG. 2 is a partial plan view showing the schematic construction of the optical coupler in the embodiment of the invention.
Figure 3:
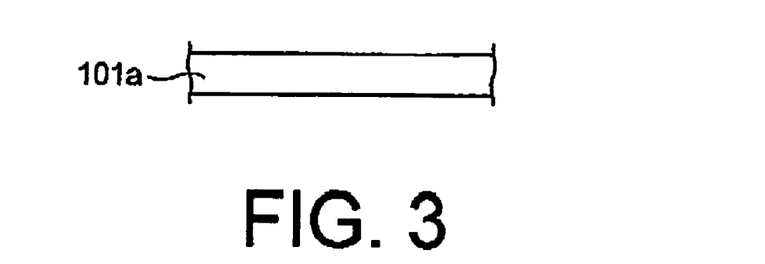
FIG. 3 is a side view showing the schematic construction of the optical coupler in the embodiment of the invention.
Figure 4:
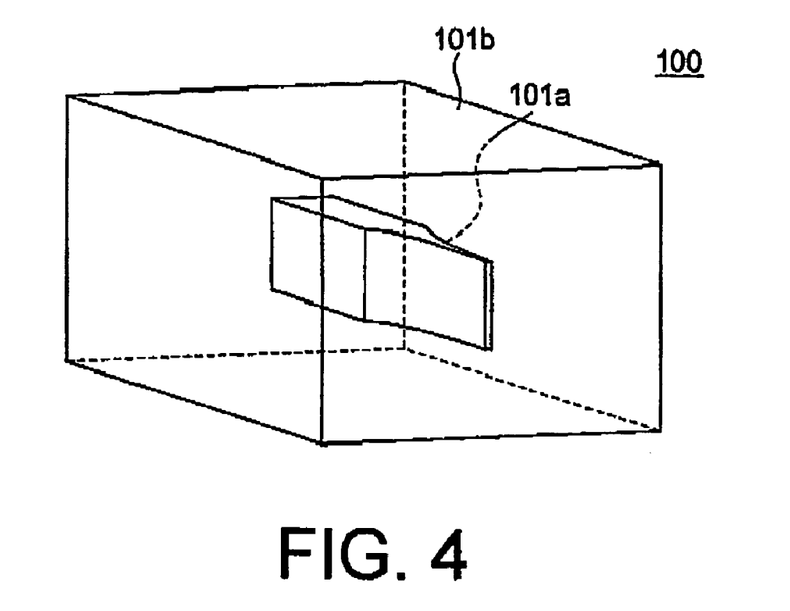
FIG. 4 is a perspective view showing the schematic construction of the optical coupler in the embodiment of the invention.

FIG. 1 is a plan view showing a schematic construction of an optical coupler in an embodiment of the invention, FIG. 2 is a partial plan view, FIG. 3 is a side view, and FIG. 4 is a perspective view. As shown in FIG. 1, an optical coupler 101 of the embodiment is used by being disposed between a compact optical waveguide type function device, which is not shown, and a single mode optical fiber 102.

As shown in FIG. 2, the optical coupler 101 of the embodiment is adapted to perform spot size conversion by forming the width of a core 101a surrounded by a cladding 101b, gradually narrower from a predetermined position. On the other hand, as shown in FIG. 3, the height along a direction perpendicular to a substrate of the core 101a is designed so as not to be varied but constant.

Therefore, by utilizing the photolithography method, which is generally well known, and etching a desired optical material using a mask pattern having a form shown in FIG. 2, the optical coupler of the embodiment can be formed.

As shown in FIG. 2, since the width of the core 101a is adapted to include a tapered waveguide that tapers down as closer to the light exit end 201, the spot size of a light signal propagating in the optical wave guide 101 is enlarged not only laterally but also three-dimensionally, Therefore, according to the optical waveguide 101 of the embodiment, the coupling factor to the optical fiber can be reduced. However, in the case of matching the waveguide to a device such as a PLC type optical function device having a smaller Δn equal to or less than 3% than the semiconductor type optical function element, while narrowing the width of the core 101a to the optimal waveguide width, the lightwave mode coupled to the radiation mode becomes larger.

Since the radiation mode escapes from the binding of the waveguide 101 and spreads circumferentially, the spot size is being apparently enlarged, however, it continues to become enlarged after becoming an optimal spot size. On this account, the spot size of the radiation mode becomes too broad when traveling further in the traveling direction, and larger than the spot size of the optical fiber, and therefore, the coupling efficiency will be deteriorated again.

Occurrence of such phenomenon is caused by that, since the smaller the normalized propagation constant b, the smaller the ratio at which the expanded lightwave mode feels the waveguide core becomes, the component converted into radiation mode becomes larger than the component converted into waveguide mode due to change in the waveguide width.

The normalized propagation constant b ($b=(n_{eff}^2-n_2^2)\div(n_1^2+n_2^2)$) is a parameter that indicates the ratio at which the light mode propagating through the waveguide exists in the core, and when b=0.1, about 10% of the lightwaves feel the core of the waveguide (exist in the core).

The light signal of the lightwave mode that has been once broken free from the binding of the waveguide and coupled to the radiation mode has the wavefront curved as it travels, and thereby, the light signal once coupled to the radiation mode is very difficult to be re-coupled to the waveguide mode, even if the waveguide structure through which it propagates is changed.

Here, in order to make it possible to control the ratio of the radiation mode from the waveguide to take a constant value, the following program is configured by using the BPM (Beam Propagation Method), and the form of the waveguide is simulated. The BPM is a general simulation technique that handles change in the optical power in the traveling direction of the waveguide as described above.

```
For
    reduce waveguide width
        make one step forward in BPM
        obtain coupling factor to inherent mode of waveguide
having the same width as current tapered waveguide sectional
waveguide.
        If difference between previous coupling factor and current
coupling factor is more than ϵ,
            restore waveguide width and BPM step
            make one step forward in BPM
    end
end
```

In the above described program, the coupling factor of the inherent mode of the wave guide section and the conversion mode having traveled through the tapered waveguide is obtained, and the amount of reduction of the coupling factor is the ratio of the lightwaves coupled to the radiation mode. Searching for a structure that changes only by a constant coupling ratio relative to the change in the waveguide width, the coupling to the radiation mode can be suppressed.

In other words, that is as follows. First, assuming that a predetermined position of the tapered waveguide is the first position, and a position separated at a predetermined distance from the first position in a direction along which the light signal of the tapered waveguide is radiated, i.e., the position the above described one step forward from the first position is the second position. Here, the above described tapered waveguide may be constructed so that the difference between the first coupling factor to the waveguide having the same width as that in the first position in the inherent mode in the case of cutting the tapered waveguide in the first position, and the second coupling factor to the waveguide having the same width as that in the second position in the inherent mode in the case of cutting the tapered waveguide in the second position may be within a predetermined range, i.e., a value less than the above described $\epsilon$.

The structure of the optical coupler designed by such technique can be approximated by the following equation.

$$W(z)=(W_i-W_o)\exp(-\alpha_1 z)+W_o$$

In this equation, W is a waveguide width and z is a distance from the starting point of the tapered form. Further, $W_i$ is an initial waveguide width of the tapered waveguide. Furthermore, $W_o$ is assumed as a critical waveguide width here and indicates that, when the waveguide width becomes smaller than $W_o$, the coupling ratio increases more than a constant value. Moreover, $\alpha_1$ is a constant calculated from the initial waveguide width reduction value at the time of start of the waveguide.

According to the above described calculation technique, it is clear that, even when the refractive index difference $\Delta$ changes, the critical waveguide width has the normalized frequency V parameter in the vicinity of 0.4. $W_o$ in the respective index differences $\Delta$ and the V parameter with the $W_o$ is shown in the following first table.

TABLE 1

| | $W_o$ | V |
|---|---|---|
| $\Delta 1.0\%$ | 0.505 | 0.40 |
| $\Delta 1.3\%$ | 0.446 | 0.41 |
| $\Delta 2.0\%$ | 0.328 | 0.41 |

By using the design method, as shown in the following equation, the tip tapered waveguide is analyzed by the 2D-BPM. Note that the refractive index difference is $\Delta 1.3\%$, and the waveguide width at the time of start is 2.0 μm.

$$W(z)=1.55\exp(-0.00654z)+0.45$$

Figure 5:
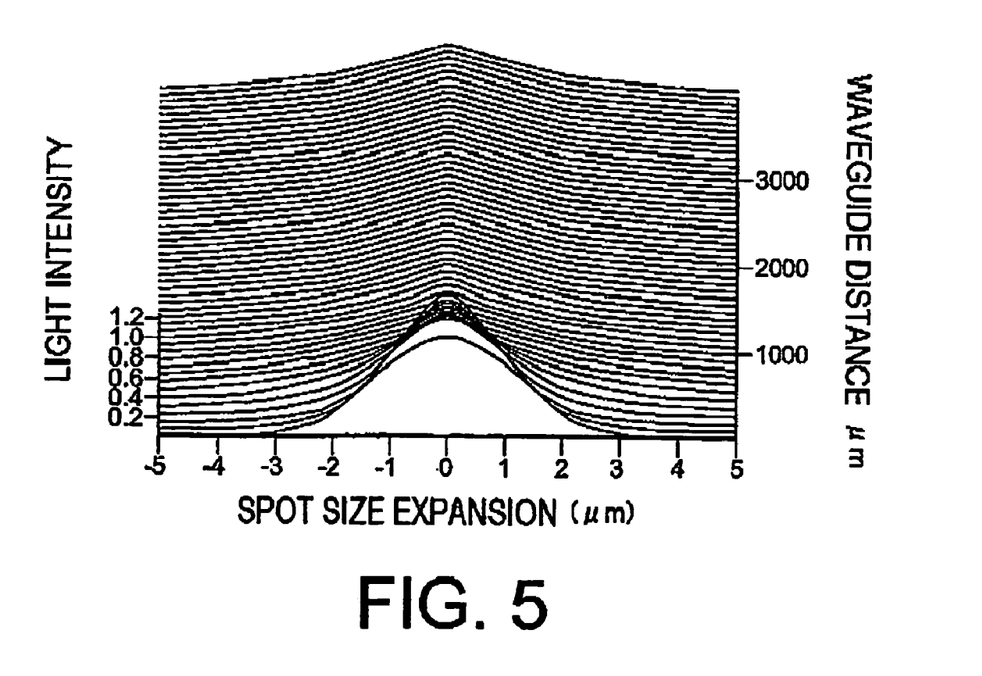
FIG. 5 is an explanatory diagram showing a result of analysis by 2DBPM.
Figure 6:
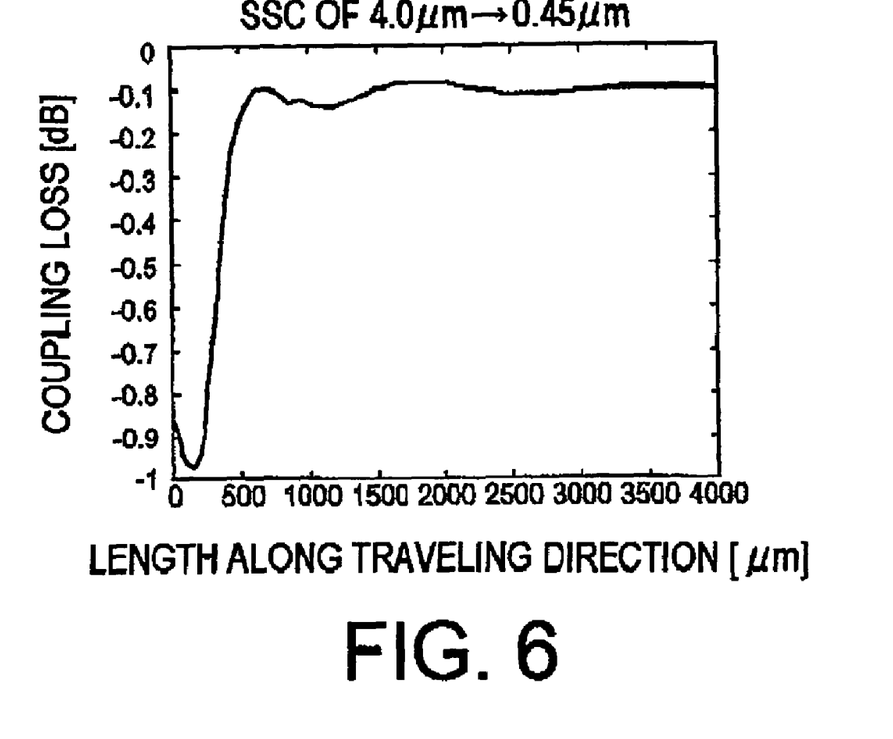
FIG. 6 is a characteristic diagram showing the length of taper along the traveling direction and the coupling loss to an optical fiber in the optical coupler of the embodiment.

The analysis result by the 2DBPM at this time is shown in FIGS. 5 and 6. Note that FIG. 5 is an explanatory diagram showing change in the intensity profile of light, and FIG. 6 shows the length of the taper along the traveling direction and the coupling loss to the optical fiber. As shown in FIG. 5, it is seen that, initially, there is a radiation, and then, the light energy is adiabatically converted on the beam. Further, as shown in FIG. 6, it is seen that the wavefront curvature can be controlled from the coupling loss to the optical fiber.

Figure 7:
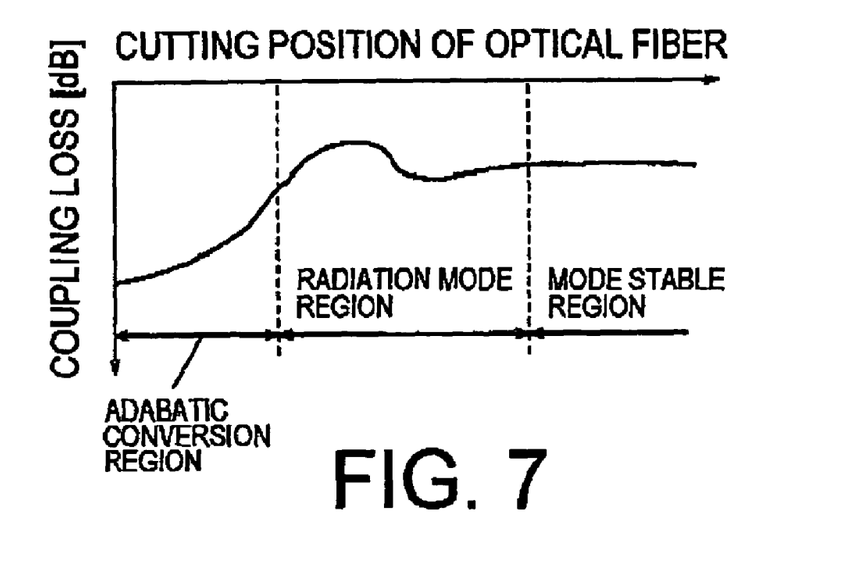
FIG. 7 is a characteristic diagram showing the behavior of the lightwave within the optical coupler of exponential function type.

The behavior of the lightwave within the exponential function type optical coupler can be considered by dividing into three stages toward the traveling direction of the waveguide, as shown in FIG. 7, and for convenience, it is assumed that the first stage is an adiabatic conversion region, the second stage is a radiation mode region, and the third stage is a mode stable region.

Describing the adiabatic conversion region of the first stage, the enlargement of the spot size of the lightwave in the waveguide and the conversion into the radiation mode progress in this process, and the spot size is being enlarged with reduction of the waveguide width.

Next, describing the second radiation mode region, the lightwave of the radiation mode is subjected to diffraction radiation in this process, and thereby, the coupling loss can be most effectively improved in this region. The improvement in the coupling loss in the radiation mode region can be obtained by the enlargement of the spot size of the lightwave coupled to the radiation mode. However, the spot size of the lightwave that has once coupled to the radiation mode is free from the binding of the waveguide. Therefore, the spot size continues to become enlarged as it travels in the traveling direction of the waveguide, and matching to the optical fiber becomes enlarged so as to exceed the size, and as a result, the increase in the coupling loss will be exhibited.

Next, describing the third adiabatic conversion region, here, the waveguide width becomes nearly $W_o$, the lightwave coupled to the radiation mode has been radiated, and there is only the lightwave coupled to the waveguide mode. In the mode stable region, the coupling loss becomes stable. As shown in FIG. 7, the coupling loss in the mode stable region changes as $W_o$ changes; When $W_o$ is small, the spot size is not sufficiently expanded and the coupling loss to the optical fiber becomes larger, and on the contrary, when $W_o$ is made too much larger the coupling to the radiation mode increases and the coupling loss becomes larger again. From the fact as described above, there is an optimal value of $W_o$, which is determined by the waveguide parameter.

The critical waveguide width $W_o$ can be defined by the normalized propagation constant b, and determined depending on the value of the step coupling loss difference $\epsilon$ in the above described program. For example, the lightwave is programmed to travel by 0.01 μm in z direction in one step, and the coupling loss at the tip (emission end) of the waveguide 2,000 μm ahead is assumed as 1%. In this case, the step coupling loss difference $\epsilon$ may be considered as the step coupling loss difference $\epsilon$ with which the loss in the 200,000 steps ahead totally becomes 1% and determined by $\epsilon=1-(1-0.01)^{1/200,000}$, resulting in $\epsilon=5.025E-08$. Here, V=0.4, which is V parameter corresponding to the derived critical waveguide width $W_o$, is converted into normalized frequency b parameter of nearly b=0.1.

Generally, the coupling factor to the optical fiber is improved by reducing the b parameter. In the conventional optical coupler of tapered waveguide type, the b parameter at the tip of the waveguide is set between 0.01 and 0.2. However, since the b parameter of the critical waveguide width is on the order of 0.1, in the high $\Delta$ waveguide having higher refractive index difference, the radiation mode coupling increases and the tolerance in the cutting position can not be ensured. Therefore, by adjusting the waveguide width of the tip portion of the waveguide not to less than the critical waveguide width, the coupling loss to the optical fiber can be reduced.

The b parameter needed to determine the critical waveguide width $W_o$ can be determined by obtaining $\epsilon$ from the radiation loss to the waveguide tip portion by the above described technique, and executing the above described program.

Figure 8:
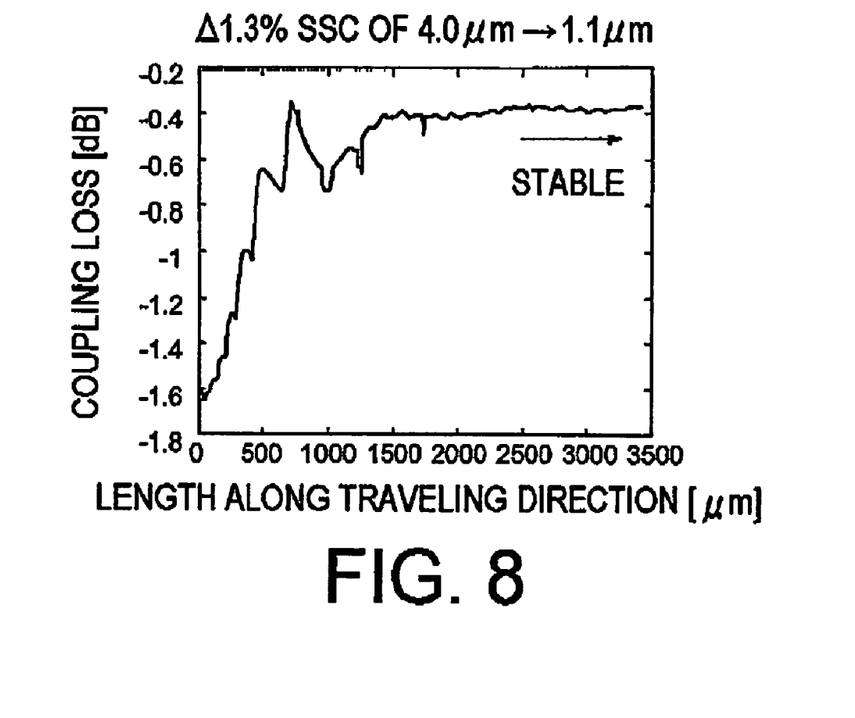
FIG. 8 is a characteristic diagram showing the length of taper along the traveling direction and the coupling loss to an optical fiber in the optical coupler in which the refractive index difference $\Delta$ is set to 1.3%.

By using such design technique to estimate the coupling characteristics to the optical fiber at $\Delta 1.3\%$ using the three-dimensional full vector BPM, it is seen that the stable coupling can be obtained at the point further forward than the taper length of some degree, as shown in FIG. 8. In this waveguide structure, the waveguide width is tapered by exponential function taper from initial value 4.0 μm to 1.3 μm at 2,500 μm. It is seen that, the coupling loss becomes the lowest at the position where the waveguide width is equal to or less than 1.5 μm, and after that, the coupling loss varies for a while, and then, the coupling loss becomes stable on the order of 0.4 dB from the position where the taper length is about 1.0 mm, and the lightwave propagates afterward.

Figure 9:
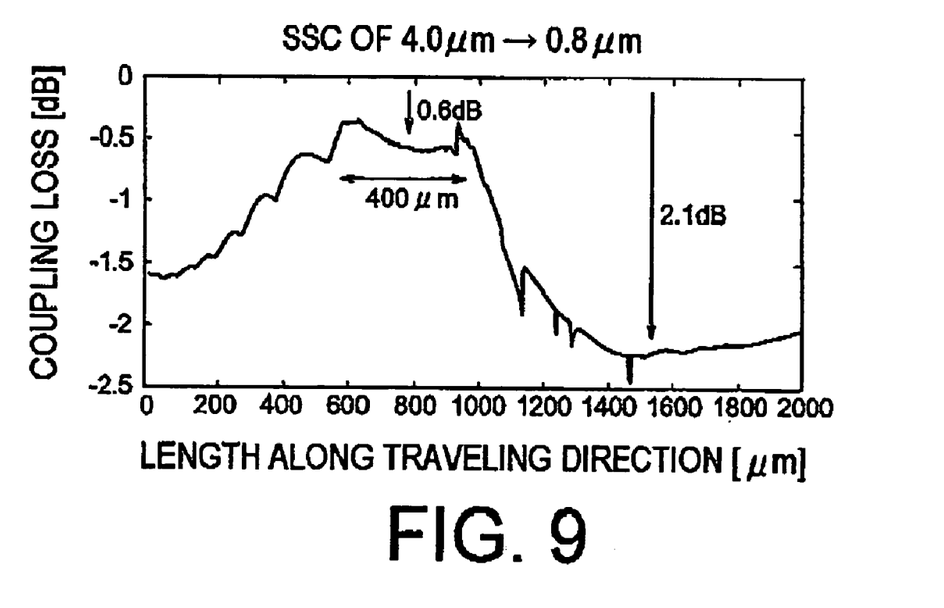
FIG. 9 is a characteristic diagram showing coupling characteristics in the case where $W_o$ of the optical coupler is set narrower than the critical waveguide width.

FIG. 9 shows coupling characteristics in the case where $W_o$ is set narrower than the critical waveguide width. It is seen that the radiation mode is generated and the stable coupling can not be obtained as well as in the linear tapered structure. By the conventionally proposed method, since the normalized frequency at the tapered tip potion is optimized to the device to be coupled, in the case of the condition in which the normalized propagation constant b of the tip waveguide becomes smaller than the optimal normalized propagation constant b, the lightwave coupled to the radiation mode becomes larger, and as a result, the coupling loss increases and the stability in coupling can not be obtained.

Then, by the following equation, the tolerance to the variation of the refractive index difference Δ generated at the time of manufacturing the optical coupler is considered. The analysis is performed under the following condition for the refractive index differences of Δ1.2% and 1.4%.

$$W(z)=2.9 \exp(-0.003448z)+1.1$$

Figure 10:
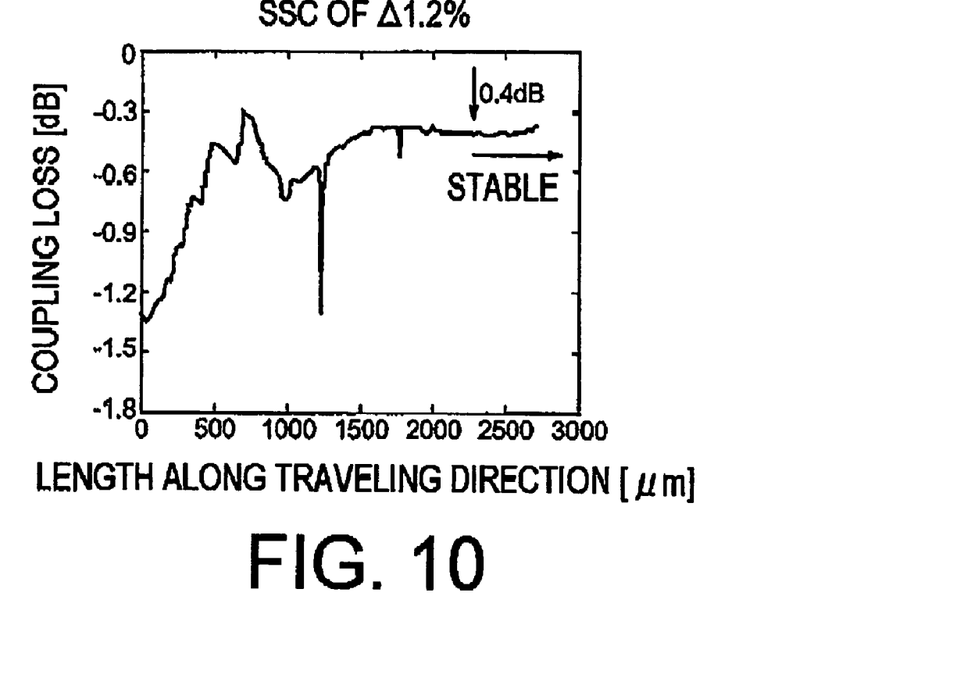
FIG. 10 is a characteristic diagram showing the length of taper along the traveling direction and the coupling loss to an optical fiber in the optical coupler in which the refractive index difference Δ is set to 1.2%.
Figure 11:
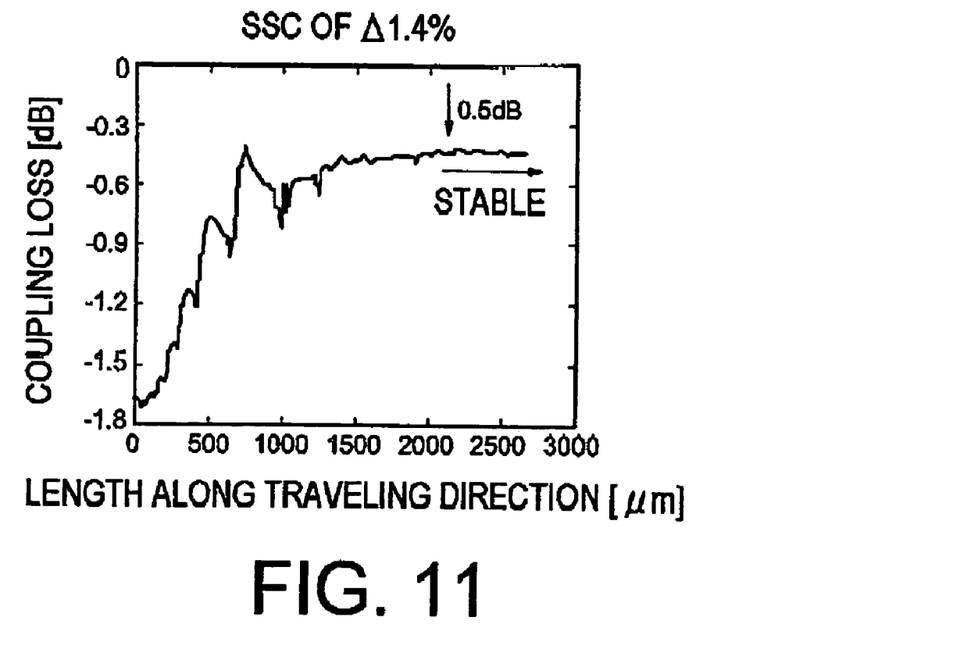
FIG. 11 is a characteristic diagram showing the length of taper along the traveling direction and the coupling loss to an optical fiber in the optical coupler in which the refractive index difference Δ is set to 1.4%.

The result for the refractive index difference Δ1.2% is shown in FIG. 10, and the result for the refractive index difference Δ1.4% is shown in FIG. 11. The coupling loss is less than 0.5 dB and the tolerance width 0.1 dB can be maintained in both cases. Thereby, it is clear that the large manufacturing tolerance of the coupling loss can be obtained by the optical coupler in the embodiment.

Next, another embodiment of the invention will be described.

As another embodiment of the invention, a waveguide structure of Δ1.4% is manufactured by using AP-CVD (atmospheric pressure chemical vapor deposition). The waveguide structure is 4.0 μm×4.0 μm. As the SSC structure, "$W(z)=2.9 \exp(-0.003448z)+1.1$" is used.

Figure 12:
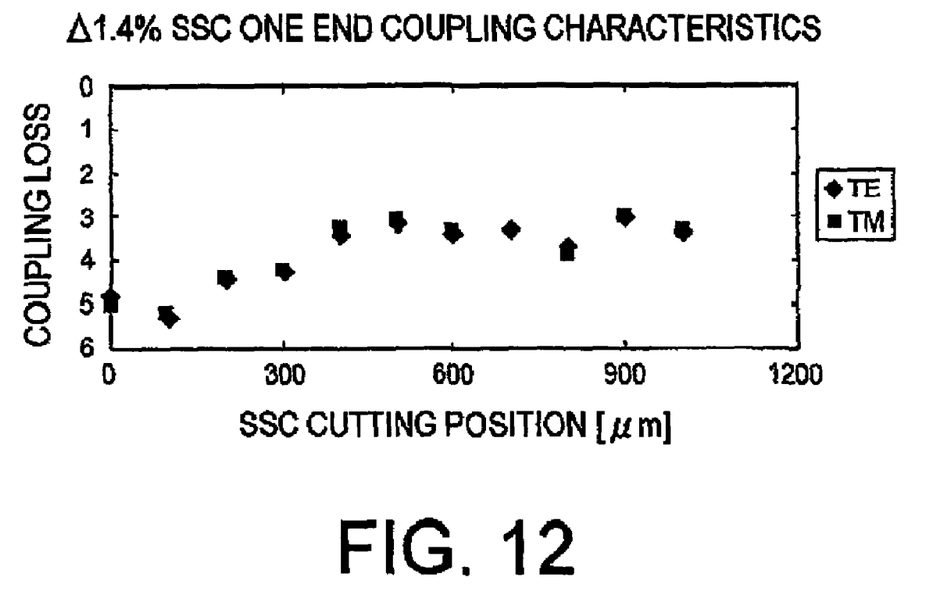
FIG. 12 is a characteristic diagram showing the cutting position and the coupling loss.

This SSC structure result is the same as that the result of which is shown in FIG. 8. As well as the result shown in FIG. 8, FIG. 12 is a graph showing the cutting position and the coupling loss. In FIG. 12, the status of the TM mode and the status of the TE mode are shown. This measurement result is of SSC structure only on one end, and it is seen that the connection loss of 2.0 dB is improved to 0.5 dB.

Next, a manufacturing method of the optical coupler will be described.

Figure 13:
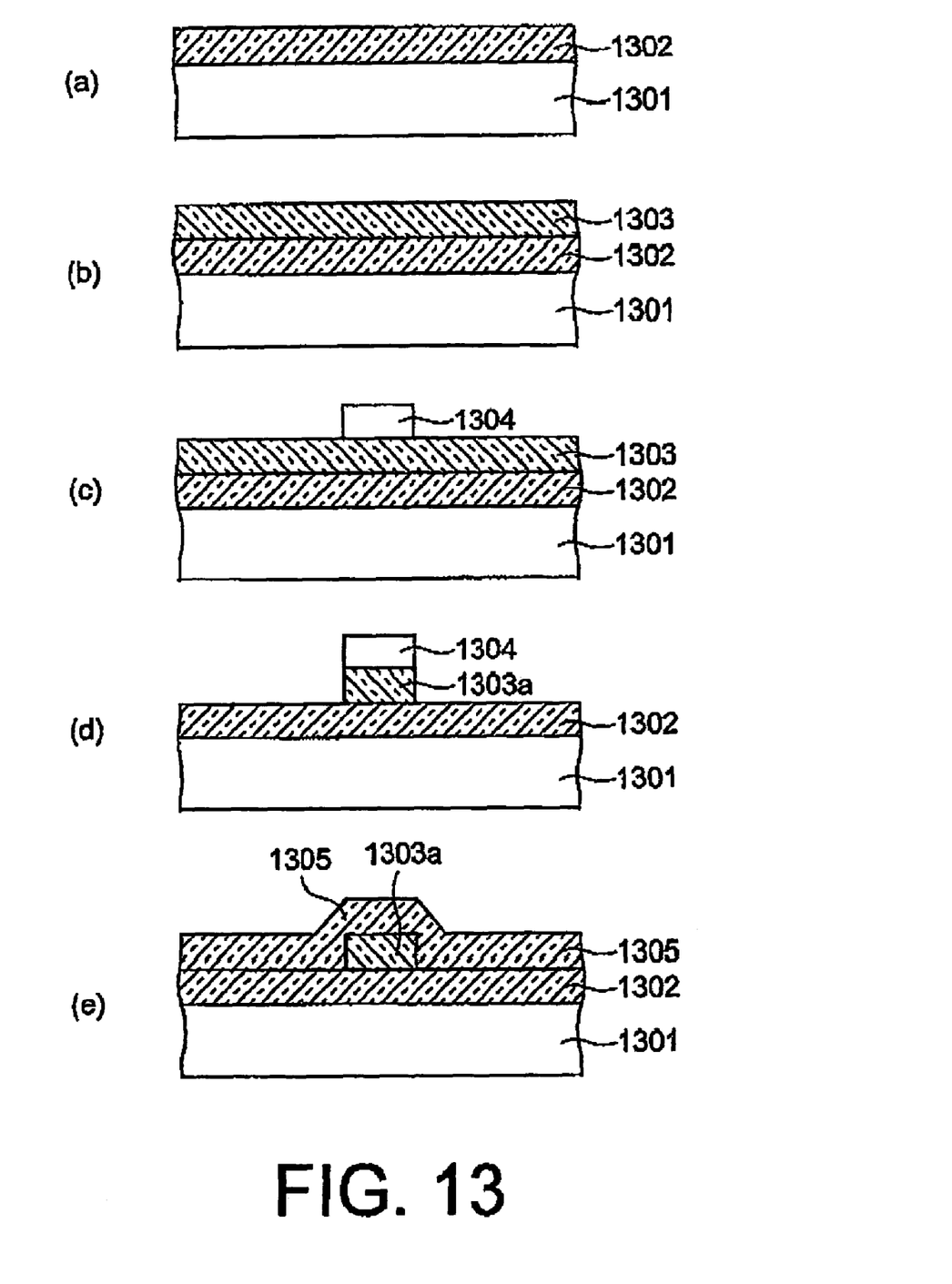
FIG. 13 is a process drawing showing a manufacturing process of the optical coupler.

First, as shown in FIG. 13(a), PSG (phosphorus doped silica glass) is deposited on a Si substrate 1301 by AP-CVD (atmospheric pressure chemical vapor deposition) to form a cladding layer 1302. Then, as shown in FIG. 13(b), BPSG (boron phosphorus doped silica glass) is deposited on the cladding layer 1302 by AP-CVD (atmospheric pressure chemical vapor deposition) to form a glass layer 1303, and these are annealed for six hours in 800° C. atmosphere.

Then, on the annealed glass layer 1303, a pattern 1304 that gradually narrowed in a predetermined form shown in the above described embodiment is formed by the photolithography technology (FIG. 13(c)). Subsequently, with the formed pattern 1304 as a mask, the glass layer 1303 is processed by RIE (reactive ion etching) using $CF_4$ gas, and a gradually narrowed core 1303a is formed as shown in FIG. 13(d). Then, the pattern 1304 on the core 1303a is eliminated by ashing using oxygen gas, for example.

At last, BPSG is deposited by AP-CVD method and this is annealed for six hours in 800° C. atmosphere, and an upper cladding layer 1305 is formed so as to cover the core 1303a, as shown in FIG. 13(e).

By the process described above, the optical coupler having the waveguide structure with glass is completed. By the way, silica glass is taken as an example here, however, that can be realized similarly by a glass waveguide structure using another glass material. Further, the embedded type waveguide is shown here, however, a ridge structure waveguide Is similarly manufactured.

In addition, in place of the Si substrate, another substrate such as a silica substrate can be used. Further, for formation of layers consisted of the respective materials, not limited to the CVD method, another deposition technique such as flame deposition method for depositing glass particles on the substrate in flame by oxidative reaction of mixed gas of $SiCl_4$ and $TiCl_4$ may be used.

Next, a manufacturing method of the optical coupler with a compound semiconductor as a material will be described.

Figure 14:
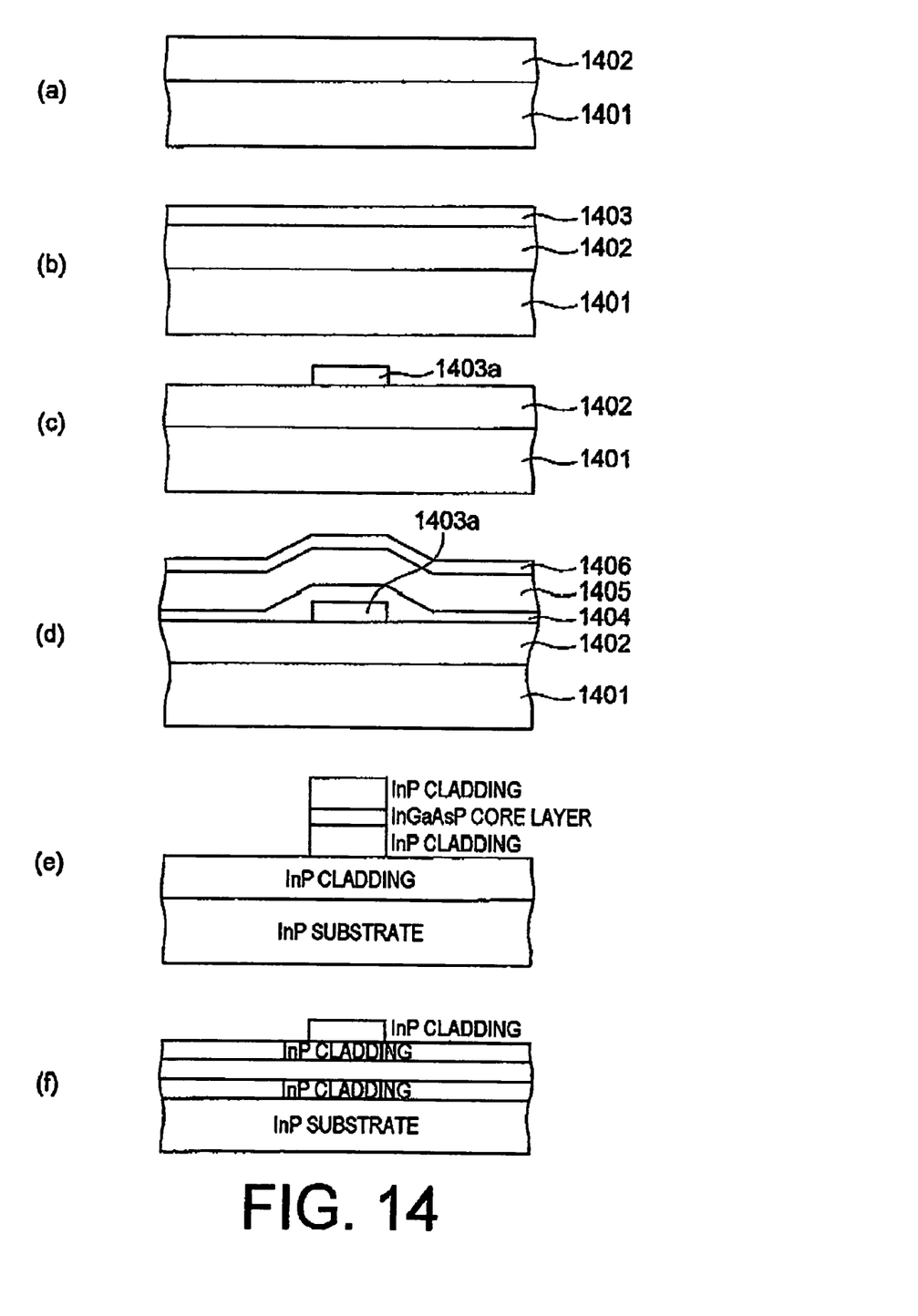
FIG. 14 is a process drawing showing a manufacturing process of the optical coupler.

First, as shown in FIG. 14(a) on an InP substrate 1401, an InP cladding layer 1402 is crystal grown by the metal organic chemical vapor deposition (MOCVD), for example. Then, as shown in FIG. 14(b), a semiconductor layer 1403 serving as a transparent core to waveguide light is formed. The semiconductor layer 1403 is constituted by an undoped InP layer having a film thickness of 50 nm, a non-strain InGaAsP layer having a wavelength composition of 1.3 μm in a film thickness of 150 nm, and an undoped InP layer having a film thickness of 50 nm.

Then, formed semiconductor layer 1403 is processed by the publicly known photolithography technology and a dry etching technology by inductive coupling plasma (ICP), and a core layer 1403 is formed on the InP cladding layer 1402, as shown in FIG. 14(c). Here, the core layer 1403a is formed in a tapered form that is gradually narrowed exponentially.

Subsequently, selective growth is performed and a p-InP layer 1404 having doping concentration of $7.0×10^{17}$ ($1/cm^3$) is crystal grown in a thickness of 0.6 μm, and further, an n-InP cladding 1405 having doping concentration of $7.0×10^{17}$ ($1/cm^3$) is crystal grown in a film thickness of 3 μm. At last, a p-InGaAs contact layer 1406 having doping concentration of $1.0×10^{19}$ ($1/cm^3$) is formed in a film thickness of 100 nm. By forming the cladding thickly as described above, light is never radiated to the upper portion of the substrate even when the spot size is enlarged due to spot size conversion.

By the above described process, the optical coupler having the electrically isolated InP semiconductor waveguide structure can be formed. In such construction, the refractive index difference Δ is on the order of 4% in the InP system semiconductor, and the spot size conversion can be performed by exponentially narrowing the waveguide width of this optical coupler from 2 μm to about 0.4 μm. Here, Inp is taken as an example, however, that is similarly realized by another semiconductor waveguide structure such as GaAs. Further, the embedded type waveguide is described here, however, a high mesa structure waveguide as shown in FIG. 14(e) and a ridge structure waveguide as shown in FIG. 14(f) can be similarly manufactured.

Next, a manufacturing method of the optical coupler using a polymeric material will be described.

Figure 15:
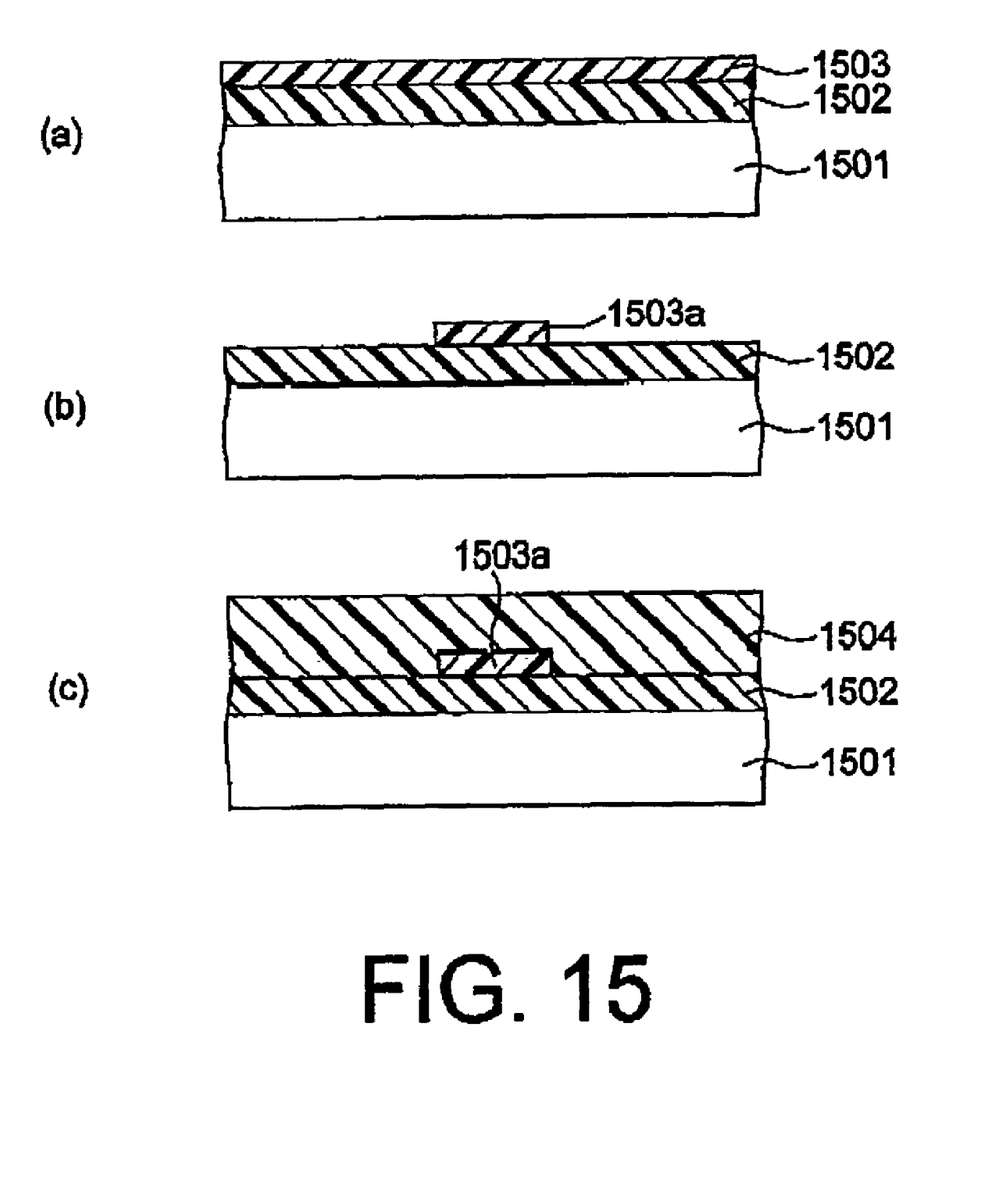
FIG. 15 is a process drawing showing a manufacturing process of the optical coupler.

First, as shown in FIG. 15(a), a cladding layer 1502 having a film thickness of 20 μm is formed by applying deuterated PMMA (polymethylmethacrylate) on an Si substrate 1501 by the spin coating method and heat curing it. Subsequently, on the cladding layer 1502, a photosensitive resin film 1503 consisted of ultraviolet curing epoxy resin is formed in a film thickness of 8 μm also by the spin coating method.

Then, with ultraviolet light as a light source, the photosensitive resin film 1503 is exposed to a light image in the tapered form tapered as described above, the region serving as a core is ultraviolet cured. After that, dry etching using oxygen gas is performed, and a core 1503a in the tapered form tapered as described above is formed as shown in FIG. 15(b). Note that heating after dry etching accelerates the effect of the core 1503a. At last, an over cladding layer 1504 is formed so as to cover the core 1503a by applying deuterated PMMA and heat curing it, as shown in FIG. 15(c), and thus, the embedded waveguide structure is formed.

This waveguide has the refractive index difference on the order of 1.3% and effectively functions as the above described optical coupler. By the way, PMMA system polymer is taken as an example of a polymeric material, however, another polymeric material such as fluoride polymer may be used. Further, not limited to the embedded type waveguide, a high mesa structure waveguide and a ridge structure waveguide may be constructed.

As described above, according to the invention, since the coupling ratio to the radiation mode is controlled and the light energy coupled to the radiation mode is suppressed, beneficial effects that adiabatic change can be made and the coupling loss to the optical fiber can be reduced are obtained. Further, since the height of the waveguide is not changed, increase in the manufacturing cost can not be caused, and the above described matter can be realized.

Note that it is obvious that the invention is not limited to the above described respective embodiments, and, within the range of the technical idea of the invention, appropriate changes can be made to the above described respective embodiments.

The invention claimed is:

1. An optical coupler comprising:
a tapered waveguide formed so that a waveguide width of said tapered waveguide is narrower toward an emission end of a light signal than at a predetermined starting position,
wherein a difference between a first coupling factor and a second coupling factor is set to be lower than a third value,
wherein the first coupling factor is a coupling factor to a waveguide having a same width as said tapered waveguide in a first position in an inherent mode, where said tapered waveguide is cut in said first position,
wherein the second coupling factor is a coupling factor to a waveguide having a same width as said tapered waveguide in a second position in an inherent mode, where said tapered waveguide is cut in said second position,
wherein, said second position is separated at a predetermined distance from said first position along a direction of said tapered waveguide toward said emission end.

2. An optical coupler according to claim 1, wherein said third value is obtained by subtracting from 1, a second value resulted by raising a first value obtained by subtracting from 1, a desired coupling loss to a subject, to which the light signal emitted from the emission end at a tip of said emission end is coupled, to a power of a number of division of dividing said tapered waveguide by the predetermined distance between said first position and said second position.

3. An optical coupler according to claim 1, wherein said waveguide is constituted by a silicon system glass material.

4. An optical coupler according to claim 1, wherein said waveguide is constituted by a semiconductor.

5. An optical coupler according to claim 1, wherein said waveguide is constituted by a polymeric material.

6. An optical coupler comprising:
a tapered waveguide formed so that a waveguide width of the tapered waveguide is narrower toward an emission end of a light signal than at a predetermined starting position,
wherein the width of the tapered waveguide, toward a traveling direction of said light signal, changes in a form of an exponential function.

7. An optical coupler according to claim 6, wherein said exponential function is expressed by $W(z)=(W_i-W_o)\exp(-\alpha_1 z)+W_0$, assuming that a waveguide width is W, a distance from a start point of said tapered waveguide is z, an initial waveguide width of the tapered waveguide is $W_i$, a width of said emission end is $W_o$, and a constant calculated from of an initial waveguide width deduction value at the time of starting of said tapered waveguide is $\alpha_1$.

8. An optical coupler according to claim 6, wherein said waveguide is constituted by a silicon system glass material.

9. An optical coupler according to claim 6, wherein said waveguide is constituted by a semiconductor.

10. An optical coupler according to claim 6, wherein said waveguide is constituted by a polymeric material.

* * * * *